(12) United States Patent
Cadet et al.

(10) Patent No.: US 10,642,072 B2
(45) Date of Patent: May 5, 2020

(54) OPTICAL ARTICLE COMPRISING A COATING THAT IS A PRECURSOR OF AN ANTIFOG COATING HAVING ANTIFOULING PROPERTIES

(71) Applicant: SATISLOH AG, Baar (CH)

(72) Inventors: Mamonjy Cadet, Charenton le Pont (FR); Alexis Theoden, Charenton le Pont (FR)

(73) Assignee: SATISLOH AG, Baar (CH)

( * ) Notice: Subject to any disclaimer, the term of this patent is extended or adjusted under 35 U.S.C. 154(b) by 707 days.

(21) Appl. No.: 15/101,364

(22) PCT Filed: Dec. 3, 2014

(86) PCT No.: PCT/EP2014/076357
§ 371 (c)(1),
(2) Date: Jun. 2, 2016

(87) PCT Pub. No.: WO2015/082521
PCT Pub. Date: Jun. 11, 2015

(65) Prior Publication Data
US 2016/0306198 A1    Oct. 20, 2016

(30) Foreign Application Priority Data

Dec. 3, 2013 (FR) ...................... 13 62048

(51) Int. Cl.
| | | |
|---|---|---|
| C09D 183/04 | (2006.01) | |
| C09D 183/08 | (2006.01) | |
| G02B 1/18 | (2015.01) | |
| G02B 27/00 | (2006.01) | |
| G02C 11/08 | (2006.01) | |

(52) U.S. Cl.
CPC ............ *G02C 11/08* (2013.01); *C09D 183/04* (2013.01); *C09D 183/08* (2013.01); *G02B 1/18* (2015.01); *G02B 27/0006* (2013.01)

(58) Field of Classification Search
CPC .................. G02B 1/18; G02B 27/0006; C09D 183/04–183/12
See application file for complete search history.

(56) References Cited

U.S. PATENT DOCUMENTS

| 4,467,073 A * | 8/1984 | Creasy ............... C08G 18/6283 525/123 |
| 6,183,872 B1 | 2/2001 | Tanaka et al. ................ 428/429 |
| 2003/0049370 A1 | 3/2003 | Lacan et al. |
| 2009/0178218 A1 * | 7/2009 | Jones ...................... A47L 13/16 15/105 |
| 2010/0247890 A1 * | 9/2010 | Habassi ............... C03C 17/3405 428/220 |
| 2015/0062704 A1 | 3/2015 | Henky et al. |

FOREIGN PATENT DOCUMENTS

| EP | 1324078 | 7/2003 |
| EP | 2021836 | 6/2011 |
| FR | 20130050459 | 7/2014 |
| JP | 2004317539 | 11/2004 |
| JP | 2005-505427 | 2/2005 |
| JP | 2005187936 | 7/2005 |
| JP | 2005-523364 | 8/2005 |
| JP | 2005281143 | 10/2005 |
| JP | 2008-152085 | 7/2008 |
| JP | 2008-274037 | 11/2008 |
| JP | 2009-175500 | 8/2009 |
| JP | 2009-226729 | 10/2009 |
| JP | 2010-160484 | 7/2010 |
| WO | WO 2006/049020 | 5/2006 |
| WO | WO 2008/053020 | 5/2008 |
| WO | WO 2010/109154 | 9/2010 |
| WO | WO 2011/080472 | 7/2011 |
| WO | WO 2012/153072 | 11/2012 |
| WO | WO 2013/005710 | 1/2013 |
| WO | WO 2013/013929 | 1/2013 |
| WO | WO 2014/102271 | 7/2014 |
| WO | WO 2014/102298 | 7/2014 |
| WO | WO 2014/111513 | 7/2014 |

OTHER PUBLICATIONS

Machine translation of WO 2006/049020 A1. (Year: 2006).*
Optool DSX technical data sheet from Daikin. (Year: 2016).*
Machine translation of JP 2004-317539A (Year: 2004).*
Owens et al., J. Appl. Polym. Sci., 13, pp. 1741-1747 (Year: 1969).*
Japanese Office Action issued in corresponding Japanese Patent Application No. 2016-536777, dated Sep. 4, 2018 (English Translation).
International Search Report and Written Opinion issued in PCT/EP2014/076357, dated Feb. 12, 2015.
Owens et al., "Estimation of the surface free energy of polymers", *J Appl Polym Sci.*, 13: 1741-1747, 1969.
Third Party Observations issued in corresponding European Patent Application No. 14809345, dated Jan. 22, 2019.

* cited by examiner

*Primary Examiner* — Ramsey Zacharia
(74) *Attorney, Agent, or Firm* — Norton Rose Fulbright US LLP

(57) ABSTRACT

The present invention relates to an optical article having a substrate coated with a coating that is a precursor of an antifog coating, the surface of which has a static contact angle with water larger than 90° and a polar surface energy component higher than 1.5 mJ/m². The precursor of the antifog coating, which furthermore possesses antifouling properties, is converted into an actual antifog coating by applying a surfactant film to its surface.

18 Claims, 1 Drawing Sheet

OPTICAL ARTICLE COMPRISING A COATING THAT IS A PRECURSOR OF AN ANTIFOG COATING HAVING ANTIFOULING PROPERTIES

CROSS-REFERENCE TO RELATED APPLICATIONS

This application is a national phase application under 35 U.S.C. § 371 of International Application No. PCT/EP2014/076357 filed 3 Dec. 2014, which claims priority to French Application No. 1362048 filed 3 Dec. 2013. The entire contents of each of the above-referenced disclosures is specifically incorporated by reference herein without disclaimer.

The present invention is concerned with obtaining an optical article, more particularly an ophthalmic lens, the surface of which has been modified in order to have antisoiling properties and at the same time to have an effective and long-lasting antifogging effect after application of a temporary antifogging solution. The present invention relates to such an article, to the process for preparing same and to the combination thereof with a surfactant or a fabric impregnated with such a surfactant giving it antifogging properties.

Numerous supports, such as plastics and glass, exhibit the disadvantage of becoming covered with fogging when the temperature of their surface falls below the dew point of the ambient air. This is the case in particular with glass, which is used to form windows for transportation vehicles or buildings, mirrors, ophthalmic lenses, such as spectacle lenses, and the like. The formation of fogging on these surfaces leads to a decrease in the transparency, due to the scattering of light by the water drops, which can cause significant nuisance.

In order to prevent the formation of fogging in a very humid environment, that is to say the condensation of minute water droplets on a support, it is possible to deposit, on the external surface of this support, hydrophilic coatings having a low static contact angle with water (typically 10° or less). These permanent antifogging coatings, the hydrophilic properties of which result from hydrophilic compounds permanently bonded to another coating or support, act as sponges with regard to the fogging and make it possible for the water droplets to adhere to the surface of the support by forming a very thin film which gives a sense of transparency. As a result of the absorption of water, they expand, soften and become mechanically weaker.

Another solution consists in using a thin porous layer having a low refractive index, partially composed of surfactants, which allow the layer to acquire permanent antifogging properties.

A more advantageous alternative to permanent antifogging coatings consists in obtaining an antifogging coating by application of a temporary hydrophilic solution to the surface of a precursor coating for an antifogging coating.

A description has been given, in international patent applications WO 2011/080472, WO 2012/153072 and WO 2013/013929, of the deposition, on the external surface of an optical article coated with a coating comprising silanol groups at its surface, of a precursor coating for an antifogging coating obtained by grafting a compound having a polyoxyalkylene group, in particular an organosilane of formula $CH_3O-(CH_2CH_2O)_{6-9}-(CH_2)_3Si(OCH_3)_3$ (III). This precursor coating for an antifogging coating is hydrophilic since it has a static contact angle with water ranging from 10° to 50°. The actual antifogging coating, which is a temporary coating, is obtained after application of a film of a surfactant composition at the surface of the precursor coating, directly in liquid form or by means of dry or wet wipes comprising said composition.

The precursors for antifogging coatings described in these applications give access to antifogging coatings that are very efficient, but for which it is desirable to improve the cleanability. The latter, also referred to as "hydrophobic and/or oleophobic coatings", are generally manufactured from fluorosilanes or fluorosilazanes, i.e. silanes or silazanes containing fluorine atoms, and do not naturally make it possible to impart antifogging properties. Compounds that can be used to obtain such antisoiling coatings are described in patents JP 2005187936 and U.S. Pat. No. 6,183,872.

Japanese application JP 2004/317539 describes a lens coated with an antireflection coating and with a coating formed by depositing a compound comprising a fluorinated hydrophobic group, a hydrophilic group comprising a polyoxyethylene group and a group capable of reacting with the surface of the substrate, for example the compound of formula $C_8F_{17}O(CH_2CH_2O)_2CONH(CH_2)_3Si(OCH_3)_3$. The coating thus formed has a contact angle with water that varies from 50° to 90° and gives access to an antifogging coating after application of a surfactant to its surface.

Japanese application JP 2005/281143 describes other coatings for optical lenses based on non-fluorinated silanes having polyoxyethylene groups having contact angles with water of the order of 60-65°, which, once a surfactant is applied to the surface thereof, exhibit antifogging properties.

International application WO 2006/049020 describes a composition that makes it possible to form, at the surface of an optical lens, an antisoiling coating, comprising a fluorinated polymerizable silane and a polymerizable silane having a hydrophilic group (especially an oxyalkylene group), and/or hydrolyzates of these silanes. These coatings have contact angles with water of the order of 100°.

International application WO 2013/005710 describes an optical article successively coated with a layer capable of absorbing water based on an acrylic or urethane resin having a polyoxyethylene chain and with a hydrophobic layer based on an amino-modified or mercapto-modified silane. The outer surface of the article thus has a contact angle with water of greater than or equal to 100°.

The coatings disclosed in these various applications have either antisoiling properties that may be improved, or insufficient antifogging properties that may be improved.

The present invention aims to obtain an optical article comprising a precursor coating for an antifogging coating, the antisoiling properties of which would be improved relative to the known precursor coatings. The inventors have discovered that the recourse to "mixed" surfaces, having both hydrophilic functions and hydrophobic functions, made it possible to retain a satisfactory antifogging performance while significantly improving the ability of the coating to be cleaned.

The objectives of the invention are achieved owing to an optical article that has a substrate coated with a precursor coating for an antifogging coating, the surface of which has a static contact angle with water of greater than 90° and a polar component of the surface energy of greater than 1.5 $mJ/m^2$.

The invention also relates to a process for preparing such an optical article, comprising:

a) providing a substrate having at least one main surface,
b) depositing on said main surface of the substrate at least one hydrophilic compound A and at least one hydrophobic compound B, so as to obtain a precursor coating for an antifogging coating, the surface of which has a static contact angle with water of greater than 90° and a polar component of the surface energy of greater than 1.5 mJ/m$^2$.

The invention also relates to an assembly comprising the optical article as defined above and a surfactant.

BRIEF DESCRIPTION OF THE DRAWINGS

The present invention will be described in greater detail with reference to FIGS. 1 to 3 which represent the kinetics for eliminating soiling from an optical article according to the invention in comparison with optical articles from the prior art, under the effect of successive cleaning cycles.

Figure 1:
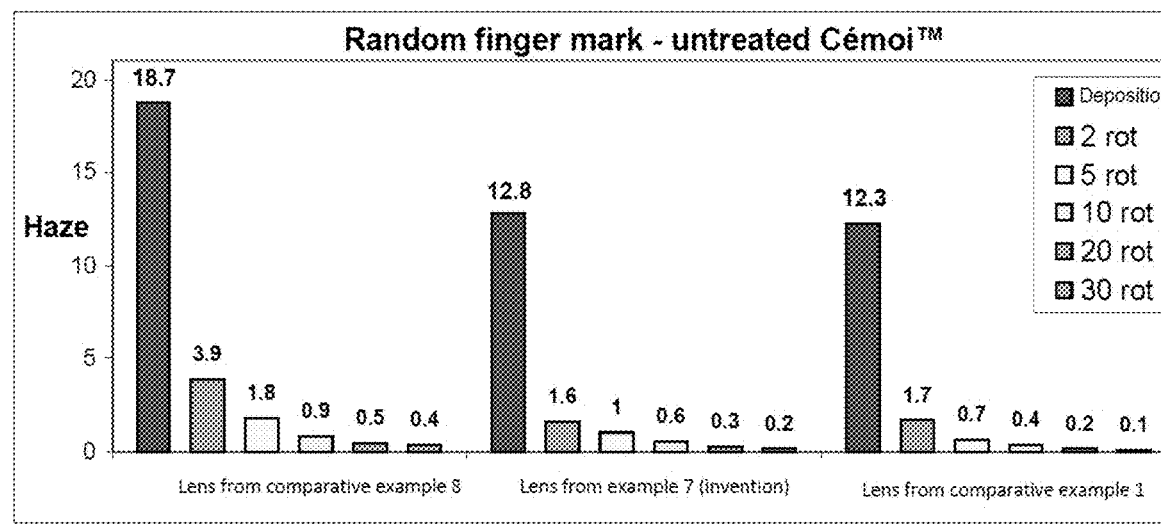
FIG. 1: shows that the ophthalmic lens according to the invention is much less sensitive to soiling than the lens from comparative example 8 which is a lens having a surface that comprises a precursor for an antifogging coating from the prior art.

In the present patent application, a coating which is "on" a substrate/coating or which has been deposited "on" a substrate/coating is defined as a coating which (i) is positioned above the substrate/coating, (ii) is not necessarily in contact with the substrate/coating, that is to say that one or more intermediate coatings may be positioned between the substrate/coating and the coating in question (however, it is preferably in contact with said substrate/coating), and (iii) does not necessarily completely cover the substrate/coating. When "a layer 1 is located under a layer 2", it will be understood that the layer 2 is further from the substrate than the layer 1. Likewise, an "outer" layer is further from the substrate than an "inner" layer.

The term "antifogging coating" is understood to mean, in the present patent application, a coating which, when a transparent glass substrate coated with this coating is placed under conditions which bring about fogging on said substrate not equipped with said coating, immediately makes possible a visual acuity $>6/10^{th}$ for an observer observing, through the coated glass, a visual acuity chart located at a distance of 5 meters. A test which makes it possible to evaluate the antifogging properties of a coating is described in the experimental section. Under conditions which bring about fogging, the antifogging coatings may either not exhibit fogging at their surface (no visual distortion in the ideal case or else visual distortion but visual acuity $>6/10^{th}$ under the measurement conditions indicated above) or may exhibit fogging at their surface but all the same may make possible, despite the disturbance to vision caused by the fogging, a visual acuity $>6/10^{th}$ under the measurement conditions indicated above. A non-antifogging coating does not make possible a visual acuity $>6/10^{th}$ while it is exposed to conditions bringing about fogging and generally exhibits a veil of condensation under the measurement conditions indicated above.

The term "antifogging glass" is understood to mean, in the present patent application, a glass equipped with an "antifogging coating" as defined above.

The term "precursor for an antifogging coating" is understood to mean, in the present patent application, a coating which, by applying a composition containing a surfactant to its surface so as to form a film, constitutes an antifogging coating within the meaning of the invention. The composition comprising a surfactant may be a liquid solution applied directly on an optical article, or a composition impregnating a wipe, this wipe possibly being wet or dry (absence of solvents), for example a CEMOI™ dry wipe impregnated with Capstone™ FS3100 such as that described in patent application WO 2013/013929.

The surfactants that make it possible to form an antifogging film preferably comprise a fluorocarbon group and at least one polyoxyalkylene unit. The assembly formed by the precursor coating and the film of surfactant-based solution constitutes the actual anti-fogging coating.

Thus, the precursor for the antifogging coating according to the invention, which is a coating having a hydrophobic surface, is not regarded as being an antifogging coating within the meaning of the invention. In fact, this precursor for the antifogging coating does not make possible a visual acuity $>6/10^{th}$ under the measurement conditions indicated above.

The term "temporary antifogging coating" is understood to mean an antifogging coating obtained after the application of a liquid solution containing at least one agent that imparts antifogging properties, preferably a surfactant, to the surface of a precursor coating for said antifogging coating. The durability of a temporary antifogging coating is generally limited by actions in which its surface is wiped, the surfactant molecules not being permanently attached to the surface of the coating, but simply adsorbed in a more or less lasting fashion.

The optical article prepared according to the invention comprises a substrate, preferably which is transparent (Tv greater than 85%, better still greater than 90%, even better still greater than 95% and optimally greater than 97%. The Tv factor corresponds to a standardized international definition (ISO 13666:1998 standard and is measured in accordance with the ISO 8980-3 standard). It is defined in the wavelength range extending from 380 to 780 nm), having front and back main faces, at least one of said main faces, preferably both main faces, comprising at least one precursor coating for an antifogging coating. The "back face" of the substrate (the back face generally being concave) is understood to be the face that, when the article is being used, is closest to the eye of the wearer. Conversely, the "front face" of the substrate (the front face generally being convex) is understood to be the face that, when the article is being used, is furthest from the eye of the wearer.

Although the article according to the invention can be any optical article capable of being confronted with the formation of fogging, such as a screen, a window for the motor vehicle industry or the construction industry, or a mirror, it is preferably an optical lens, better still an ophthalmic lens, for spectacles, or a blank for an optical or ophthalmic lens. This excludes articles, such as intraocular lenses in contact with living tissues or contact lenses, which are not intrinsically confronted with the problem of the formation of fogging.

The precursor coating of the antifogging coating is in direct contact either with a main surface of the substrate, or with a first coating, when said main surface of the substrate is coated with a first coating. The first coating of the invention, which preferably comprises silanol groups at its surface, may be formed on at least one of the main faces of a bare substrate, i.e. an uncoated substrate, or on at least one of the main faces of a substrate already coated with one or more functional coatings.

In the remainder of the application, the preparation of the layers will be described by direct deposition of these layers on the optical article.

The invention also comprises an embodiment in which the deposition of all of the layers or of some of them is carried out on a film having a face comprising said coatings and a face intended to be adhesively bonded to the surface of the optical article.

Apart from the adhesive bonding, the desired coatings may also be transferred from a support on which the coatings have been deposited in the reverse order to which they may appear on the final article.

The substrate of the optical article according to the invention, which comprises at least one main surface, may be a mineral or organic glass, for example an organic glass made of thermoplastic or thermosetting plastic.

Classes of substrates which are particularly preferred are poly(thiourethanes), polyepisulfides and the resins resulting from the polymerization or (co)polymerization of alkylene glycol bis(allyl carbonate)s. The latter are sold, for example, under the trade name CR-39® by PPG Industries (Orma® lenses, Essilor).

Other substrates that can be used within the context of the invention are acrylic substrates of thermoset type, thermoplastic substrates such as substrates based on Nylon™, polycarbonate and PMMA.

In some applications, it is preferable for the main surface of the substrate to be coated with one or more functional coatings prior to the deposition of the first coating. These functional coatings conventionally used in optics can, without limitation, be a layer of impact-resistant primer, an abrasion-resistant and/or scratch-resistant coating, a polarized coating, a photochromic coating or a colored coating, in particular a layer of impact-resistant primer coated with an abrasion-resistant and/or scratch-resistant layer.

The first coating may be deposited on an abrasion-resistant and/or scratch-resistant coating. The abrasion-resistant and/or scratch-resistant coating can be any layer conventionally used as abrasion-resistant and/or scratch-resistant coating in the field of ophthalmic lenses.

The coatings resistant to abrasion and/or to scratches are preferably hard coatings based on poly(meth)acrylates or on silanes generally comprising one or more mineral fillers intended to increase the hardness and/or the refractive index of the coating once cured. They are described in greater detail in application WO 2011/080472.

It is possible, prior to the deposition of the abrasion-resistant and/or scratch-resistant coating, to deposit, on the substrate, a primer coating which improves the impact resistance and/or the adhesion of the subsequent layers in the final product. These coatings can be any impact-resistant primer layer conventionally used for articles made of transparent polymer material, such as ophthalmic lenses, and are described in greater detail in application WO 2011/080472.

The first coating according to the invention may in particular be an abrasion-resistant and/or scratch-resistant coating or, according to the preferred embodiment, a single-layer antireflective coating or a multilayer antireflective coating. This first coating preferably comprises silanol groups at its surface.

The expression "coating comprising silanol groups at its surface" is understood to mean a coating which naturally has silanol groups at its surface or else a coating having silanol groups that were created after it was subjected to a surface activation treatment. This coating is preferably a coating based on siloxanes or on silica, for example, without limitation, a silica layer, a sol-gel coating, based in particular on organosilanes, such as alkoxysilanes, or a coating based on silica colloids. It can in particular be an abrasion-resistant and/or scratch-resistant coating or a single-layer antireflective coating or a multilayer antireflective coating, the outer layer of which has silanol groups at its surface. The expression "outer layer of a stack" is understood to mean the layer furthest from the substrate.

The surface activation treatment optionally employed to create silanol groups or at least to increase their proportion at the surface of a coating is generally carried out under vacuum. It may be a bombardment with energetic and/or reactive species, for example an ion beam (ion pre-cleaning or IPC) or an electron beam, a corona discharge treatment, a glow discharge treatment, a UV treatment or a vacuum plasma treatment. It may also be an acidic or basic surface treatment and/or a treatment with solvents. Several of these treatments may be combined.

Energetic (and/or reactive) species are understood in particular to mean ionic species having an energy ranging from 1 to 300 eV, preferably from 1 to 150 eV, better still from 10 to 150 eV and even better still from 40 to 150 eV. The energetic species may be chemical species, such as ions, radicals, or species such as photons or electrons.

The coating comprising silanol groups at its surface is preferably a layer with a low refractive index based on silicon oxide, preferentially on silica (comprising silica) and ideally consists of a layer of silica ($SiO_2$), generally obtained by vapor deposition. Said silica-based layer preferably has a thickness of less than or equal to 500 nm, better still from 2 to 110 nm and preferentially varying from 5 to 100 nm.

The coating comprising silanol groups at its surface preferably comprises at least 70% by weight of $SiO_2$, better still at least 80% by weight and even better still at least 90% by weight of $SiO_2$. As has been said, in an optimum embodiment, it comprises 100% by weight of silica.

The coating comprising silanol groups at its surface may also be a sol-gel coating based on silanes such as alkoxysilanes, organosilanes, and optionally comprising colloidal oxides, as described in greater detail in application WO 2012/153072.

According to one embodiment of the invention, the coating comprising silanol groups at its surface is a silica-based layer deposited on an abrasion-resistant coating, preferably deposited directly on this abrasion-resistant coating.

According to another embodiment of the invention, which constitutes the preferred embodiment, the optical article according to the invention comprises an antireflective coating. When such a coating is present, it generally constitutes the first coating within the meaning of the invention. This antireflective coating can be any antireflective coating conventionally used in the optical field, in particular the field of ophthalmic optics.

An "antireflective coating" is defined as a coating, deposited at the surface of an optical article, which improves the antireflective properties of the final optical article. It makes it possible to reduce the reflection of light at the article/air interface over a relatively broad portion of the visible spectrum.

As is also well known, antireflective coatings conventionally comprise a single-layer or multilayer stack of dielectric materials. These are preferably multilayer coatings, comprising layers with a high refractive index (HI) and layers with a low refractive index (LI). The composition of these coatings, their thickness and their method of deposition are described in particular in applications WO 2010/109154 and WO 2012/153072.

Before the formation of the precursor for the antifogging coating on the first coating or on the bare substrate, it is normal to subject the surface of this first coating or of the substrate to a physical or chemical activation treatment intended to increase the adhesion of the precursor for the antifogging coating. These treatments can be chosen from those described above for the activation of the coating comprising silanol groups at its surface.

According to the invention, the first coating, when it is present, is directly in contact with the precursor coating for the antifogging coating. According to another embodiment, the substrate is itself directly in contact with the precursor coating for the antifogging coating, which will now be described.

The precursor coating for the antifogging coating has a surface having a static contact angle with water of greater than 90° and a polar component of this surface energy of greater than 1.5 mJ/m².

The surface energy characteristics (in mJ/m²), dispersive component and polar component of this surface energy are determined by the OWENS-WENDT method described in the reference: "Estimation of the surface free energy of polymers" OWENS D. K, WENDT R. G. (1969) J. APPL. POLYM. SCI., 13, 1741-1747. It is considered that the surface energy, $E^T$, for a liquid or solid is made up of a dispersive component, $E^D$, and of a polar component, $E^P$. It is written in the form $E^T=E^D+E^P$.

The outer coating of the optical article has a polar component of the surface energy which is preferably greater than or equal to 1.7 mJ/m², more preferably greater than or equal to 1.9 mJ/m², better still greater than or equal to 2 mJ/m² and even better still greater than or equal to 2.3 mJ/m². In one embodiment, the precursor coating for an antifogging coating has a polar component of the surface energy of less than or equal to 4 mJ/m². In another embodiment, the precursor coating for an antifogging coating has a polar component of the surface energy of less than or equal to 3.5 mJ/m², better still less than or equal to 3 mJ/m². The precursor coating for the antifogging coating preferably has a static contact angle with water of greater than or equal to 95°, more preferably greater than or equal to 100°, better still greater than or equal to 102°, and ideally greater than or equal to 105°. The static contact angle with water is preferably less than 120°.

The precursor coating for the antifogging coating is generally formed from a material containing fluorocarbon groups and polyoxyalkylene groups, that is to say that it comprises both hydrophilic units and hydrophobic units.

According to one preferred embodiment, the precursor coating for the antifogging coating is formed by depositing in sufficient amounts on the first coating or on the substrate at least one hydrophobic compound B and at least one hydrophilic compound A, preferably in the gas phase, better still by evaporation, followed by a grafting. The compounds A and B are film-forming compounds.

The term "hydrophilic compound" is understood to mean a compound of which a film formed at the surface of a substrate has a static contact angle with water of less than or equal to 60°, preferably less than or equal to 55°, better still less than or equal to 50°. In the present application, the contact angles are measured in the manner described in application WO 2008/053020.

The term "hydrophobic compound" is understood to mean a compound of which a film formed at the surface of a substrate has a static contact angle with water of greater than or equal to 75°, preferably greater than or equal to 90°, more preferably greater than or equal to 100°, better still greater than or equal to 110°. Preferably, the film formed at the surface of a substrate has a static contact angle with water of less than or equal to 117°, better still less than or equal to 116°, 115°, 114°, 113°.

The hydrophilic compound A bears at least one hydrophilic group. "Hydrophilic" groups are understood within the context of the present invention to mean combinations of atoms which are capable of associating with water molecules, especially by hydrogen bonding. These are generally polar organic groups, which may comprise charged atoms. The compound A preferably comprises at least one group selected from polyoxyalkylene, polyamine, polyol (polyhydroxylated group, for example a polysaccharide or polyglycerol group) and polyether (for example a polyol ether) groups, preferably a polyoxyalkylene group. The compound A generally comprises at least one group capable of establishing a covalent bond with a functional group present on the outer surface of the substrate or of the first coating to which it will be grafted, or present in the compound B, said functional group preferably being a silanol group in the case where a first coating is present. This group, which is a reactive group, can be, without limitation, one of the following groups: an isocyanate, acrylate, methacrylate, haloalkyl, carboxylic acid, sulfonic acid, phosphonic acid or ester, acyl chloride, chlorosulfonyl, chloroformate or ester group, a silicon atom bearing at least one hydrolyzable group or a group containing an epoxy function, such as the glycidyl group, preferably a silicon atom bearing at least one hydrolyzable group, in particular a silanol group or a precursor thereof.

The compound A is preferably an organosilane compound, better still an organosilane compound having at least one silicon atom bearing at least one hydrolyzable group, even better still an organosilane compound having a polyoxyalkylene group and at least one silicon atom bearing at least one hydrolyzable group.

Preferably, its polyoxyalkylene chain is functionalized at just one end or at both its ends, ideally at just one end, by at least one, preferably just one, group comprising at least one silicon atom bearing at least one hydrolyzable group. This organosilane compound preferably comprises a silicon atom bearing at least two hydrolyzable groups, preferably three hydrolyzable groups. It is preferably a compound of formula:

$$R^1(Y)_mSi(X)_{3-m} \quad (I)$$

wherein the Y groups, which are identical or different, are monovalent organic groups bonded to the silicon via a carbon atom, the X groups, which are identical or different, are hydrolyzable groups or hydroxy groups, $R^1$ is a group comprising a polyoxyalkylene function and m is an integer equal to 0, 1 or 2. Preferably, m=0.

The X groups are preferably selected from the alkoxy groups —O—$R^3$, where $R^3$ is a preferably $C_1$-$C_4$, better still C1, linear or branched alkyl radical, acyloxy groups —O—C(O)$R^4$ where $R^4$ is a preferably $C_1$-$C_6$ linear or branched alkyl radical, preferably methyl or ethyl, halogen groups such as Cl and Br or trimethylsiloxy $(CH_3)_3SiO$—, —$NH_2$, —$NHSiMe_3$ or —NH— alkyl groups or dialkylamino groups in which the linear or branched alkyl groups are preferably $C_1$-$C_6$ groups (for example the —$N(CH_3)_2$ and —$N(C_2H_5)_2$ groups), and the combinations of these groups. Preferably, the X groups are alkoxy groups, in particular methoxy or ethoxy groups and better still ethoxy groups.

The Y group, present when m is not zero, is preferably a saturated or unsaturated, linear or branched hydrocarbon group, preferably a $C_1$-$C_{10}$ group and better still a $C_1$-$C_4$ group, for example an alkyl group, such as methyl or ethyl, a vinyl group or an aryl group, for example a monocyclic or bicyclic aromatic group for example a phenyl group, which is optionally substituted, in particular by one or more $C_1$-$C_4$ alkyl groups. Preferably, Y represents the methyl group.

According to a preferred embodiment, the compound of formula (I) comprises a trialkoxysilyl group, such as a triethoxysilyl or trimethoxysilyl group.

The polyoxyalkylene group of the organosilane compound ($R^1$ group) preferably comprises fewer than 80 carbon atoms, better still fewer than 60 carbon atoms and even better still fewer than 50 carbon atoms. The $R^1$ group preferably meets these same conditions.

The $R^1$ group generally has the formula -L-$R^2$, where L is a divalent group bonded to the silicon atom of the compounds of formula I or II via a carbon atom and $R^2$ is a group comprising a polyoxyalkylene group bonded to the L group via an oxygen atom, this oxygen atom being included in the $R^2$ group. Nonlimiting examples of L groups are the linear or branched, preferably C2 to C15, and better still C2 to C15, and even better still C2 to C10 alkylene groups which are optionally substituted, a monocyclic or bicyclic C3-C10 cycloalkylene group, preferably a monocyclic or bicyclic C3-C10 arylene group, carbonyl or amido groups, or combinations of these groups such as the cycloalkylenealkylene, biscycloalkylene, biscycloalkylenealkylene, arylenealkylene, bisphenylene, bisphenylenealkylene or amidoalkylene groups, one example of which is the $CONH(CH_2)_3$ group, or else the —$OCH_2CH(OH)CH_2$— and —$NHC(O)$— groups. The preferred L groups are the preferably linear alkylene groups preferably having 10 carbon atoms or fewer, better still 5 carbons of fewer, for example the ethylene and propylene groups.

The preferred $R^2$ groups comprise a polyoxyethylene group —$(CH_2CH_2O)_n$—, a polyoxypropylene group or combinations of these groups.

The preferred organosilanes of formula (I) are compounds of formula (II) below:

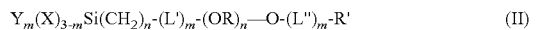

where R' is a hydrogen atom, an acyl group or an alkyl group which is a linear or branched, preferably C1-010 and better still C1 to C5 group which is optionally substituted by one or more functional groups and which can additionally comprise one or more double bonds, R is a linear or branched alkylene group, preferably a linear alkylene group, preferably comprising from 2 to 3 C, for example an ethylene or propylene group, L' and L", which are identical or different, are divalent groups, X, Y and m are as defined above, n' is an integer ranging from 1 to 10, preferably from 1 to 5, n is an integer ranging from 3 to 50, preferably from 4 to 50, better still from 4 to 30 and better still from 5 to 25, m' is equal to 0 or 1, preferably 0, and m" is equal to 0 or 1, preferably 0.

The L' and L" groups, when they are present, may be selected from the divalent L groups described above and preferably represent the —$OCH_2CH(OH)CH_2$— group or the —$NHC(O)$— group. In this case, the —$OCH_2CH(OH)CH_2$— or —$NHC(O)$— groups are connected to the adjacent groups $(CH_2)_{n'}$ (in the case of an L' group) and R' (in the case of an L" group) via their oxygen atom (for the —$OCH_2CH(OH)CH_2$— group) or via their nitrogen atom (for the —$NHC(O)$— group).

The —$O$-$(L")_{m"}$-$R'$ group is preferably an alkoxy group (m"=0, R'=alkyl), ideally a methoxy group.

Preferably, the compounds of formula (I) or (II) comprise just one silicon atom bearing at least one hydrolyzable group.

According to one embodiment, m=0 and the hydrolyzable groups X denote methoxy or ethoxy groups. n' is preferably equal to 3. According to another embodiment, R' denotes an alkyl group having fewer than 5 carbon atoms, preferably the methyl group. R' can also denote an aliphatic or aromatic acyl group, in particular the acetyl group.

Finally, R' can denote a trialkoxysilylalkylene or trihalosilylalkylene group, such as the —$(CH_2)_{n''}Si(R^5)_3$ group, the $R^5$ groups being identical or different, $R^5$ is a hydrolyzable group, such as the X groups defined above, and n" is an integer such as the n' group defined above. An example of such an R' group is the —$(CH_2)_3Si(OC_2H_5)_3$ group. In this embodiment, the organosilane compound comprises two silicon atoms bearing at least one hydrolyzable group.

According to preferred embodiments, n is equal to 3 or else varies from 6 to 9, from 9 to 12, from 21 to 24 or from 25 to 50, preferably from 6 to 9.

Mention may be made, as examples of compounds of formula (II), of the 2-[methoxy(polyethyleneoxy)propyl]trimethoxysilane compounds of formulae $CH_3O$—$(CH_2CH_2O)_{6-9}$—$(CH_2)_3Si(OCH_3)_3$ (III) and $CH_3O$—$(CH_2CH_2O)_{9-12}$—$(CH_2)_3Si(OCH_3)_3$ (IV), sold by Gelest Inc. or ABCR, the compound of formula $CH_3O$—$(CH_2CH_2O)_3$—$(CH_2)_3Si(OCH_3)_3$ (VIIa), more generally the compounds of formula $CH_3O$—$(CH_2CH_2O)_n$—$(CH_2)_3Si(OCH_3)_3$, where n varies from 4 to 45 (including in particular n=21, 22, 23 or 24), 2-[methoxy(polyethyleneoxy)propyl]trichlorosilanes, 2-[acetoxy(polyethyleneoxy)propyl]trimethoxysilane of formula $CH_3C(O)O$—$(CH_2CH_2O)_{6-9}$—$(CH_2)_3Si(OCH_3)_3$, 2-[acetoxy(polyethyleneoxy)propyl]triethoxysilane of formula $CH_3C(O)O$—$(CH_2CH_2O)_{6-9}$—$(CH_2)_3Si(OC_2H_5)_3$, 2-[hydroxy(polyethyleneoxy)propyl]trimethoxysilane of formula $HO$—$(CH_2CH_2O)_{6-9}$—$(CH_2)_3Si(OCH_3)_3$, 2-[hydroxy(polyethyleneoxy)propyl]triethoxysilane of formula $HO$—$(CH_2CH_2O)_{6-9}$—$(CH_2)_3Si(OC_2H_5)_3$, the compounds of formulae $HO$—$(CH_2CH_2O)_{8-12}$—$(CH_2)_3Si(OCH_3)_3$ and $HO$—$(CH_2CH_2O)_{8-12}$—$(CH_2)_3Si(OC_2H_5)_3$, bis[(3-methyldimethoxysilyl)propyl]polypropylene oxide and compounds comprising two siloxane heads, such as bis[(3-triethoxysilylpropoxy)-2-hydroxypropoxy] polyethylene oxide of formula (V), bis[(N,N'-(triethoxysilylpropyl)aminocarbonyl] polyethylene oxide of formula (VI) with n=10-15 and bis(triethoxysilylpropyl) polyethylene oxide of formula (VII):

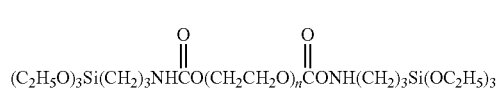

(VIIa)

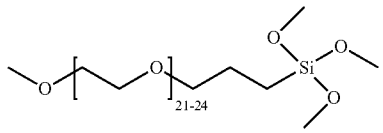

CAS: 65994-07-2

The families of compounds of formula (II) that are preferred are those of the [alkoxy(polyalkyleneoxy)alkyl] trialkoxysilanes or their trihalo analogs (m=m'=m"=0, R'=alkoxy), the preferred compound being that of formula (III).

Preferably, the compound A according to the invention does not have a fluorine atom. Preferably, the molar mass of the compound A according to the invention ranges from 400 to 4000 g/mol, preferably from 400 to 1500 g/mol, better still from 400 to 1200 g/mol and even better still from 400 to 1000 g/mol.

The hydrophobic compound B bears at least one hydrophobic group. "Hydrophobic" groups are understood within the context of the present invention to mean combinations of atoms which are not capable of associating with water molecules, especially by hydrogen bonding. These are generally nonpolar organic groups, which are free of charged atoms.

The compound B preferably comprises at least one fluorinated group, preferably perfluorinated group, typically a fluorocarbon group, preferably selected from fluoroalkyl, fluoroalkenyl, perfluoroalkyl, perfluoroalkenyl, (poly)(fluoro alkyl ether), (poly)(perfluoro alkyl ether) and (poly)fluoro alkoxy[(poly)alkyleneoxy] alkyl groups, preferably fluoroalkyl groups. These linear, cyclic or branched groups may be directly connected to one another or may be connected by means of divalent groups, in particular alkylene or alkenylene groups, oxygen atoms or nitrogen bridges (—NH—, —N═). The fluorocarbon groups preferably comprise at least 50% of fluorine atoms as a replacement for the hydrogen atoms of the hydrocarbon group from which they derive, better still at least 70% and even better still at least 90%. These groups may for example comprise units such as —CHF—, —CHF—CHF—, —CH$_2$—C(CF$_3$)$_2$—, —CF$_2$—C(CF$_3$)$_2$—, —CF$_2$—, —CF$_2$—CF$_2$—, —CF$_2$—CF$_2$—CF$_2$—, —CF$_2$—C(CF$_3$)$_2$—, —(CHF)$_n$— and —(CF$_2$)$_n$—, n denoting an integer greater than or equal to 3.

A poly(fluoro alkyl ether) group is understood to mean a group resulting from the polymerization of fluoroalkoxy units of from the copolymerization of these units with other units such as alkoxy units. Examples of such groups are the —(CHF—CHF—O)$_n$—, —(CH$_2$—CF$_2$—O)$_n$—, —(CF$_2$—CF$_2$—O)$_n$—, —(CF$_2$—CF$_2$—CF$_2$—O)$_n$—, —(CF$_2$—CH(CF$_3$)—O)$_n$—, —(CF$_2$—CF(CF$_3$)—O)$_n$— groups, n denoting an integer greater than or equal to 1. Such groups may also include polyalkoxy units such as —(CH$_2$—CH$_2$—O)$_m$—, —(CH$_2$—CH$_2$—CH$_2$—O)$_m$— and —(CH$_2$—C(CH$_3$)$_2$—O)$_m$—, m denoting an integer greater than or equal to 1.

The compound B generally comprises at least one group capable of establishing a covalent bond with a functional group present on the outer surface of the substrate or of the first coating to which it will be grafted, or present in the compound A, said functional group preferably being a silanol group in the case where a first coating is present. This group, which is a reactive group, can be, without limitation, one of the following groups: an isocyanate, acrylate, methacrylate, haloalkyl, carboxylic acid, sulfonic acid, acyl chloride, chlorosulfonyl, chloroformate or ester group, a silicon atom bearing at least one hydrolyzable group (the hydroxy group being considered here to be a hydrolyzable group) or a group containing an epoxy function, such as the glycidyl group, preferably a silicon atom bearing at least one hydrolyzable group, in particular a silanol group or a precursor thereof.

Examples of hydrolyzable groups are the X groups as defined above.

The compound B is preferably an organosilane compound (this term including in particular organosilazanes), better still an organosilane compound having at least one (preferably one) silicon atom bearing at least one hydrolyzable group, even better still an organosilane compound having at least one hydrophobic group, in particular fluoroalkyl group, and at least one silicon atom bearing at least one hydrolyzable group, for example an organoalkoxysilane. According to an embodiment, the compound B comprises at least one —Si(R)$_3$ group, where R represents a hydrolyzable group, in particular selected from the —OCH$_3$, —OC$_2$H$_5$, —OH and —NH$_2$ groups. Thus, the compound B may for example be a silazane or comprise a trialkoxysilyl group. Preferably, B comprises a trialkoxysilyl group.

Preferably, its hydrophobic chain, for example fluoroalkyl chain, is functionalized at just one end or at both its ends, ideally at just one end, by at least one, preferably just one, group comprising at least one (preferably one) silicon atom bearing at least one hydrolyzable group. This organosilane compound preferably comprises a silicon atom bearing at least two hydrolyzable groups, preferably three hydrolyzable groups.

Preferably, only one chain end of the compound B comprises a silanol group or a silanol-group precursor.

The compound B may be selected from the silanes (or silazanes) of formulae (VIII) and (IX):

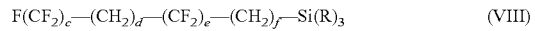

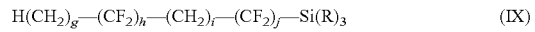

where each of c, d, e, f, g, h, i and j denote an integer ranging from 0 to 10, at least one of c, d, e and f is other than 0, at least one of g, h, i and j is other than 0, and R is a hydrolyzable group as defined above. Preferably, 5≤c+d+e+f≤15 and/or 5≤g+h+i+j≤15, and better still 5≤c+d+e+f≤12 and/or 5≤g+h+i+j≤12.

A preferred constituent B is a silazane compound, comprising a hydrolyzable Si—N bond, such as the fluoroalkylsilazane of formula CF$_3$—(CF$_2$)$_7$—CH$_2$—CH$_2$—Si(NH$_2$)$_3$. This compound is available under the name OF110™ from Optron. Other constituents B that can be used are the fluorinated compound OF210™ from the same company and the compound sold by Shin-Etsu Chemical under the name KP 911®.

When it is deposited in the form of a single layer of 5 nm on a silica (SiO$_2$) surface, the compound B generally leads to a layer possessing a surface energy less than or equal to 16 mJ/m$^2$, better still less than or equal to 15 mJ/m$^2$ and even better still less than or equal to 14 mJ/m$^2$ being obtained.

Preferably, the molar mass of the compound B according to the invention is less than or equal to 900 g/mol, more preferably less than or equal to 800 g/mol, better still less than or equal to 700 g/mol and even better still less than or equal to 700 g/mol. It preferably ranges from 300 to 800 g/mol, better still from 300 to 700 g/mol and even better still from 400 to 600 g/mol.

The precursor for the antifogging coating according to the invention, formed from at least one compound A preferably having a polyoxyalkylene group and at least one compound B preferably having a fluorocarbon group which are as defined above, also constitutes an antisoiling coating. It generally makes it possible to lower the surface energy of the optical article to 25 mJ/m$^2$ or less.

In the absence of hydrophilic compound A, the coating obtained does not have satisfactory antifogging properties, whereas in the absence of hydrophobic compound B, the coating obtained does not have satisfactory antisoiling properties.

According to one embodiment of the invention, the precursor for the antifogging coating comprises more than 80% by weight, preferably more than 90% by weight, of compounds A and B according to the invention, with respect to the total weight of the precursor for the antifogging coating. According to one embodiment, the precursor for an antifogging coating consists of a layer of said compounds A and B.

Preferably, the precursor for an antifogging coating of the invention contains less than 5% by weight of metal oxide or metalloid oxide (for example silica or alumina), with respect to the total weight of the coating, and better does not comprise it. When the organosilane compound used for the formation of the antifogging coating is deposited under vacuum, preferably no metal oxide is coevaporated with it, according to the technique for the coevaporation of at least one organic compound and of at least one inorganic compound described in the application EP 1 324 078.

According to the invention, the deposition of the compounds A and B forms a precursor coating for an antifogging coating comprising an inner portion in which said compounds A and/or B are grafted to the first coating (when it is present), to the substrate, and/or to one another (at least in part) in a permanent manner (by means of a covalent bond and not by simple adsorption), and an outer part that can be removed by washing and/or wiping (mechanically and/or chemically).

In order to arrive at such a structure, it is possible to deposit an excess of compounds A and/or B on the surface of the first coating or of the substrate preferably comprising silanol groups, preferably an excess of compound A. The adjustment of the deposition parameters in order to arrive at such a configuration is within the scope of those skilled in the art. An excess is understood to mean that an amount of hydrophilic compound A, deposited after the compound B, and/or a portion of the compound B, has remained free, that is to say that it is not grafted by a covalent bond, either with the first coating or the substrate, or with the compound A or B.

The grafting of the compounds A and B to the surface of the substrate or of the first coating includes the case where each of these two compounds is grafted covalently, directly, or else only one of them, preferably the compound B, is grafted. According to one embodiment, when the compounds A and/or B are silanes, the silicon atom of which has at least one hydrolyzable group R, at least one of the Si—R groups of the compound A and/or of the compound B is covalently bonded to a hydroxy group of the substrate or of the first coating.

The precursor coating for the antifogging coating is a coating preferably having a thickness (before wiping) of greater than or equal to 3 nm, better still 5 nm, even better still 8 nm and ideally 10 nm. Its thickness is preferably less than 100 nm, better still 50 nm and even better still 20 nm. It typically ranges from 3 to 100 nm, preferably from 5 to 50 nm.

The deposition of the compounds A and B at the surface of the first coating or of the substrate according to the invention can be carried out according to usual techniques, preferably by gas-phase or liquid-phase deposition, better still gas-phase deposition, generally in a vacuum chamber.

The vapor deposition may consist of a physical vapor deposition (PVD) or a chemical vapor deposition (CVD), such as, without limitation, an evaporation, optionally ion-beam evaporation, sputtering or plasma-enhanced chemical vapor deposition. The preferred method is physical vapor deposition, in particular vacuum evaporation, generally combined with a heating of the compounds to be evaporated. It may be implemented by using evaporation systems as diverse as a Joule-effect heat source (the Joule effect is the thermal manifestation of the electrical resistance) or an electron gun, it being possible for any other device known to those skilled in the art to also be used.

The compounds A and B can be dissolved beforehand in a solvent before being evaporated, in order to exert better control over the rate of evaporation and of deposition.

The hydrophilic compound A is preferably deposited by vacuum evaporation using a Joule-effect heat source. The hydrophobic compound B is preferably deposited by vacuum evaporation using an electron gun in order to bring about the vaporization thereof.

The compounds A and B may be deposited successively, that is to say without overlapping of the steps of depositing one and the other compound or concomitantly (for example by coevaporation) or partially concomitantly. For this, it is possible to place the two compounds A and B in a metal container, for example a copper dish, positioned on a Joule-effect system. The copper dish may contain steel wool or a metal foam (preferably nickel foam). In one embodiment, the compound A is impregnated in the steel wool or metal foam, and the compound B is simply poured into the dish.

These compounds are preferably deposited successively. The step of depositing the hydrophobic compound B is preferably started before the step of depositing the hydrophilic compound A. According to the optimum embodiment, the formation of the precursor for the antifogging coating according to the invention by vacuum evaporation is preferably carried out by successive deposition of a hydrophobic compound B and then of a hydrophilic compound A.

The duration of the deposition process and in particular of the evaporation is adjusted so as to obtain the desired coating thickness.

The deposition conditions are selected so that, after the deposition of the compounds A and B, a coating having a static contact angle with water of greater than 90° and a polar component of the surface energy of greater than 1.5 mJ/m$^2$ is obtained. The nature of the compounds used, the respective amounts thereof (which may be adjusted by adjusting the evaporated flows), the order in which they are deposited and the duration of the deposition are examples of parameters that those skilled in the art will know how to vary in order to arrive at the coating having the desired properties.

The compounds A and B are preferably used during the deposition in amounts and under conditions such that, if they were deposited on separate supports, layers of compound A and B would be formed in a [physical thickness of the layer of compound A]/[physical thickness of the layer of compound B] ratio of less than 3, and preferably of greater than 0.8. The compound A must be used in a sufficient amount so that the surface of the precursor coating for the antifogging coating has a polar component of the surface energy of greater than 1.5 mJ/m$^2$.

According to one embodiment of the invention, the deposition conditions are selected so that the actual physical thickness ranges measured for each of its layers, measured as a single layer, are from 1 to 15 nm for the layer obtained from the hydrophobic compound B; and 4-50 nm, preferably 4 to 25 nm for the layer obtained from the hydrophilic compound A.

The measurements may be made by multi-wavelength ellipsometry.

The precursor coating for the antifogging coating may be obtained by directly depositing the suitable amount of compounds A and B.

However, the inventors have found that it is preferable to form the precursor coating for the antifogging coating by depositing an excess of compounds A and B and mainly an excess of hydrophilic compound A at the surface of the optical article, and by removing the excess of these compounds, deposited but not grafted, so as to arrive at the same desired final thickness. This procedure guarantees the antifogging performance of the treated lenses. The inventors have indeed found that, when a layer of precursor coating was deposited directly without excess thickness, it was possible, in some cases, to obtain an uneven deposited layer and a precursor coating for an antifogging coating, the surface of which does not have a sufficient affinity with regard to a liquid solution of surfactant, which results in a coating that does not have the desired antifogging properties.

After the deposition of the compounds A and B in accordance with the invention, the outer portion of the coating that can be removed by wiping may be removed, by washing and/or wiping, or else may be subjected to the removal technique described in application WO 2012/153072, which involves the use of a temporary layer, in the case where such a temporary layer was deposited. The outer portion of the precursor coating for the antifogging coating can be removed by washing and/or wiping, which means that it may be removed by subjecting it in particular to washing with soapy water (containing a surfactant), using a sponge, and then with deionized water, and/or to wiping for typically 20 seconds or less, using a CEMOI™, Wypall™ or Selvith™ fabric which is dry or optionally impregnated with alcohol, typically isopropyl alcohol. This wiping operation can optionally be followed by a further rinsing with deionized water and by a final wiping with a rag.

After removal of the surplus of compounds A and optionally of compounds B deposited, that is to say of the outer portion of the precursor coating for the antifogging coating which can be removed by wiping, only the inner portion of the precursor coating for the antifogging coating containing the compounds A and B actually grafted remains at the surface of the first coating according to the invention or of the substrate. The ungrafted molecules are thus removed. The inner portion of the precursor coating cannot be removed by means of a mild treatment such as dry wiping using a fabric or a similar treatment, or else wiping with a fabric impregnated with water, soapy water or an alcohol such as isopropyl alcohol.

The invention also relates to a process for preparing an optical article as defined above, preferably an ophthalmic lens, comprising:
a) providing a substrate having at least one main surface,
b) depositing, preferably by vacuum evaporation, on said main surface of the substrate or on a first coating, when said main surface of the substrate is coated with a first coating, at least one hydrophilic compound A and at least one hydrophobic compound B, so as to obtain a precursor coating for an antifogging coating that comprises an inner portion in which said compounds A and B are grafted to the substrate or, when it is present, to the first coating, and an outer portion that can be removed by washing and/or wiping.

As explained above, the process of the invention comprises steps of exposing the main surface of the substrate or of the first coating to the compound A and/or to the compound B, generally in a vacuum chamber, giving rise to the deposition of this or these compound(s).

The process of the invention may also comprise an additional stage of depositing at least one surfactant at the surface of the precursor coating for the antifogging coating obtained after the removal of the outer portion of the precursor coating for the antifogging coating which can be removed by wiping, thus giving access to a temporary antifogging coating. This surfactant film provides the lenses with temporary protection against fogging by creating a uniform layer at their surface which helps in dispersing the water droplets over the surface of the lens so that they do not form visible fogging.

According to one embodiment, the surfactant is deposited by applying a film of a liquid solution containing at least one surfactant. The application of the surfactant solution can be carried out by any known technique, in particular by dip coating, spin coating or spray coating. The surfactant solution is preferably applied by depositing a drop of this solution at the surface of the precursor for the antifogging coating and by then spreading it so as to cover preferably all of said precursor coating. The surfactant solution applied is generally an aqueous solution, preferably comprising from 0.5% to 10% by weight, better still from 2% to 8% by weight, of surfactants.

A commercially available surfactant solution for conferring antifogging properties is the Optifog™ Activator solution from Essilor.

According to another embodiment, which is preferred, the surfactant is applied to the precursor coating using a fabric impregnated with said surfactant, for example a dry or wet wipe, preferably which is reusable. It is ideally a dry wipe, i.e. a wipe that feels dry to the touch.

These impregnated fabrics are capable of effectively dispensing the surfactant at the surface of a substrate, by simple wiping of the surface to be treated (back-and-forth translational and/or rotational movements).

The surfactant-impregnated fabric according to the invention is preferably a microfiber fabric, more preferably that is woven or knitted, better still knitted. The fabric used in the invention preferably comprises at least 80% by weight of microfibers, better still at least 90% by weight of microfibers, preferably at least 95% by weight, better still 100% by weight of microfibers. The term "microfibers" is understood to mean textile fibers, the linear density of which is less than 1.3 decitex (1.3 g/10 km). The microfiber fabric preferably comprises hydrophilic polymer microfibers and lipophilic polymer microfibers, especially polyamide microfibers and polyester microfibers, better still from 60% to 85% by weight of polyester microfibers and from 15% to 40% by weight of polyamide microfibers. An example of such a fabric is the Cemoi™ fabric, composed of 69.5% by weight of polyester microfibers and of 30.5% by weight of polyamide microfibers.

The wipe according to the invention comprises a fabric preferably impregnated with from 5% to 40% by weight of surfactants relative to the weight of the non-impregnated fabric, preferably from 10% to 40% by weight, better still from 15% to 35% by weight, and optimally from 20% to 30% by weight. The impregnated fabrics and wipes that can be used to impart antifogging properties to a substrate, and also the method of preparation, are described in greater detail in the application filed under the number FR 2013/50459.

The surfactant used must be capable of imparting antifogging properties to the optical article after application to the surface thereof, which may be verified by performing the hot steam test described in the experimental section.

A wide variety of surfactants may be used for a direct application using a solution or by means of a wipe. These can be ionic (cationic, anionic or amphoteric) or nonionic, preferably nonionic or anionic. However, a mixture of surfactants belonging to these various categories can be envisaged. Examples of surfactants that can be used are those disclosed in the applications WO 2013/013929 and FR 2013/50459. Mention may be made of polyethylene glycol alkyl monoethers, surfactants having a sorbitan ring and especially polyoxyalkylene sorbitan fatty acid esters, triblock copolymers comprising two ethylene oxide blocks and one central propylene oxide block, and compounds of polyethoxylated fluoroalkyl nature.

Preferably, use is made of a surfactant comprising a polyoxyalkylene group, better still a polyoxyalkylene group having more than 6 oxyalkylene units, and even better still a polyoxyethylene group having more than 6 oxyethylene units.

The surfactant used preferably has a hydrophilic-lipophilic balance (HLB) 5, which is preferably less than or equal to 18, better still less than or equal to 16, and even better still less than or equal to 15, so as to benefit from optimal antifogging properties. The expression "hydrophilic-lipophilic balance (HLB)" is well known to those skilled in the art and represents a characteristic quantity of a surfactant, which is greater when the water solubility of the surfactant is high. In the present application, the theoretical (calculated) value of the hydrophilic-lipophilic balance will be taken into account. The calculation methods to be used, depending on the category of surfactant, are indicated in the application FR 2013/50459.

The antifogging coating of the invention obtained after the application of the surfactant at the surface of the substrate preferably has a static contact angle with water of less than or equal to 10°, better still of less than or equal to 5°. It generally constitutes the outer coating of the optical article.

The invention also relates to an assembly comprising an optical article having a substrate coated with a precursor coating for an antifogging coating, the surface of which has a static contact angle with water of greater than 90° and a polar component of the surface energy of greater than 1.5 mJ/m$^2$; and a surfactant preferably having a hydrophilic-lipophilic balance (HLB) 5; the assembly preferably comprising a fabric impregnated with said surfactant, better still a dry wipe comprising a microfiber fabric impregnated with said surfactant.

The following examples illustrate the invention in more detail but without implied limitation. Unless otherwise indicated, all the thicknesses that appear in the present application are physical thicknesses, measured by multi-wavelength ellipsometry, after deposition.

EXAMPLES

1. Materials and Optical Articles Used

The hydrophilic organosilane compounds A used in the examples to form the precursor for the antifogging coating are 2-[methoxy(polyethyleneoxy)propyl]trimethoxysilane having from 6 to 9 ethylene oxide units, of formula (III) and with a molar mass of 450-600 g/mol (CAS No.: 65994-07-2, Ref: SIM6492.7, supplied by Gelest, Inc.), the compound of formula $CH_3O\text{—}(CH_2CH_2O)_{9\text{-}12}\text{—}(CH_2)_3Si(OCH_3)_3$ (IV), supplied by Gelest, Inc. and the compound of formula $CH_3O\text{—}(CH_2CH_2O)_{21\text{-}24}\text{—}(CH_2)_3Si(OCH_3)_3$ (IVa), supplied by Gelest (Reference: SIM6492.73).

The hydrophobic organosilane compound B used in the examples to form the precursor for the antifogging coating is the fluorinated compound OF210™ supplied by Optron. Other hydrophobic compounds used in the comparative examples are Optool DSX™ (Daikin Industries), and KY-130™ (Shin-Etsu Chemical).

The vacuum evaporation device that makes it possible to deposit the various layers (antireflective layer, precursor coating for the antifogging coating) is a Syrus III machine having two systems for evaporating materials, an electron gun evaporation system and a Joule-effect evaporation system.

The lenses used in the examples according to the invention comprise a lens substrate made of bisphenol A polycarbonate (correction −8.00 diopters, +2.00 cylinder), comprising on each of its faces a polyurethane impact-resistant primer having a thickness of the order of 1 micron, itself coated with an abrasion-resistant coating having a thickness of the order of 3 microns and with an antireflective coating having five layers $ZrO_2/SiO_2/ZrO_2/ITO/SiO_2$. These various coatings, the other deposition conditions and the treatments that they have undergone are described in greater detail in the experimental section of application WO 2012/153072.

Similar ophthalmic lenses are also reproduced, but without power (two same diopters on front (convex) face and back (concave) face) for the haze measurement.

2. Vapor Deposition of the Precursor for the Antifogging Coating

The various chemical compounds used to form precursors for an antifogging coating are firstly packaged in copper dishes provided with steel wool in order to limit the splashes of product during the evaporation by the Joule effect or via an electron gun. Each dish, containing 100 to 300 µL of compound, depending on the desired thickness, is preheated on a hot plate at 70° C. for 2 minutes before the evaporation step. This makes it possible to evaporate the optional solvents and to degas the product. The compound OF210™, used pre-packaged in a copper dish with steel wool, does not require a preheating step.

The dishes containing hydrophobic compounds, comparative compounds or compounds according to the invention are in addition covered with a tantalum cover perforated with holes obtained from Satis in order to prevent a direct impact of the electron gun on these compounds during the evaporation thereof. The cover is heated by the electron flux which itself heats the copper dish via thermal conduction. The temperature within the "oven" thus created increases until the compound evaporates.

The deposition of the precursor for the antifogging coating according to the invention on the antireflective coating of the lenses is carried out in two steps. Firstly, the hydrophobic compound B (OF210™) is deposited by vacuum evaporation using an electron beam evaporation system, placed in which are the copper dishes containing the compounds to be evaporated (rate: varying from more than 0 nm/s to 0.5 nm/s, generally of 0.25 nm/s, emission current varying from 1 to 4 mA, circular and broad electron scanning trace, mean residual pressure: $7.9 \times 10^{-4}$ Pa), then the hydrophilic compound A (compound of formula III) is deposited by vacuum evaporation using a Joule-effect heat source, namely a metal boat passed through by an electric current deposited in which are the copper dishes containing the compounds to be evaporated (rate: varying from more than 0 nm/s to 0.5 nm/s, generally of 0.25 nm/s, heating current varying from 2 to 5.5 A, mean residual pressure: $5.7 \times 10^{-4}$ Pa).

In the examples, various amounts of compounds A and B were evaporated. The ratio of thicknesses indicated in this table 1 below was calculated by dividing theoretical physical thicknesses, corresponding to the thicknesses of the coatings that would have been obtained if the various compounds used had been deposited on separate supports. Specifically, the two compounds evaporated successively are capable of reacting with one another and of resulting in a final coating having an actual thickness that is different from the sum of the theoretical thicknesses of the two layers deposited.

A precursor coating for an antifogging coating is obtained that has a thickness of the order of 10 to 17 nm (thicknesses measured with a multi-wavelength ellipsometer, including the surplus of siloxane compound).

In the comparative examples, two compounds are successively evaporated (with the exception of comparative examples 1 and 8 where a single compound is evaporated), in order to form coatings having a thickness comparable to that of example 1. The hydrophobic compounds (OF210™, Optool DSX™, KY-130™) were evaporated by means of the electron gun, whereas the hydrophilic compound (III) was evaporated by the Joule effect, except for comparative example 5 where both compounds (hydrophobic and hydrophilic) were evaporated by the Joule effect.

At the end of the evaporation, the surface of each lens is rinsed with soapy water, tap water, isopropyl alcohol, tap water, then deionized water and wiped with a dry Cémoi™ fabric so that the surplus of siloxane compounds deposited is removed. The Cémoi™ fabric denotes a fabric supplied by the supplier Facol under the reference Microfibre M8405 30×40.

The measurements of surface properties of the lenses (contact angle, surface energy) that give the results indicated in table 1 are carried out at this stage, on the lenses thus washed and wiped. The surface energy characteristics were determined using a DIGIDROP GBX device according to the Owens-Wendt method described in the reference: "Estimation of the surface free energy of polymers" Owens D. K., Wendt R. G. (1969), J. Appl. Polym. Sci., 13, 1741-1747 using two reference liquids (water and diiodomethane, needle with an internal diameter of 0.15 mm). This device also enables the static contact angles to be determined from a photograph taken at a given instant (3000 ms) after the deposition of a drop of liquid (here, water).

3. Formation of the Temporary Anti-Fogging Coating and Evaluation of the Performance Thereof Both faces of the lenses are wiped with a wipe made of Cémoi™ fabric that is impregnated with surfactant (Capstone® FS 3100, 30% by weight) by carrying out a spiral movement from the center toward the edge with the wipe, so as to "load" them with surfactant. This corresponds to one application. Various levels of application may be carried out, for example 5, 10 or 20 applications.

The lenses are then placed for 24 hours in an environment that is regulated in temperature (20-25° C.) and at a humidity of 50%, then placed for 15 seconds above a heated receptacle containing water at 55° C. (hot steam test). Immediately afterwards, a visual acuity chart located 5 m away is observed through the lens tested. The test is considered to be passed if an observer who has 10/10 vision and who has the lens placed in front of his eye obtains a visual acuity of 10/10th (in transmission, Snellen optotype chart placed 5 meters away, Armaignac Tridents, ref. T6 chart available from FAX INTERNATIONAL), and no fogging or visual distortion is observed. This test makes it possible to simulate the conditions of ordinary life where a wearer places his face above a cup of tea or coffee or a saucepan of boiling water.

The results obtained are collated in table 1. In examples 1 to 5, the antifogging properties were obtained for a surfactant application level ranging from 5 to 15 applications, whereas the lens from example 6 required around 20 applications. The lenses of comparative examples 1 to 5 did not exhibit antifogging properties, even after 20 applications of surfactant.

Comparative example 1 shows that if no hydrophilic compound A is used to form the outer coating, this lens has antisoiling properties but no antifogging property, whether the hydrophobic compound B is deposited by the Joule effect or under the action of an electron gun. Only the lenses from examples 1 to 5 according to the invention exhibit both antifogging and antisoiling properties.

TABLE 1

| Example | First compound evaporated | Second compound evaporated | $2^{nd}/1^{st}$ compound ratio (*) | $E^P$ (mJ/m$^2$) | $E^D$ (mJ/m$^2$) | $E^T$ (mJ/m$^2$) | Contact angle with water (°) | Antisoiling perf. | Antifogging perf. (**) |
|---|---|---|---|---|---|---|---|---|---|
| 1 | OF210 ™ | Compound (III) | 2.66 | 3.3 | 20.7 | 24 | 93 | +++ | Yes |
| 2 | OF210 ™ | Compound (III) | 2.15 | 2.7 | 19.2 | 21.9 | 97 | +++ | Yes |
| 3 | OF210 ™ | Compound (III) | 1.35 | 2.1 | 19.4 | 21.5 | 99 | +++ | Yes |
| 4 | OF210 ™ | Compound (IV) | 2.30 | 3.2 | 20.2 | 23.4 | 94 | +++ | Yes |

TABLE 1-continued

| Example | First compound evaporated | Second compound evaporated | $2^{nd}/1^{st}$ compound ratio (*) | $E^P$ (mJ/m²) | $E^D$ (mJ/m²) | $E^T$ (mJ/m²) | Contact angle with water (°) | Antisoiling perf. | Antifogging perf. (**) |
|---|---|---|---|---|---|---|---|---|---|
| 5 | OF210 ™ | Compound (IVa) | 1.93 | 2.4 | 19 | 21.4 | 98 | +++ | Yes |
| 6 | OF210 ™ | Compound (III) | 0.90 | 1.8 | 19.1 | 20.9 | 100 | +++ | Yes |
| 7 | OF210 ™ | Compound (III) | 1 | 2.3 | 17.6 | 19.9 | 100 | +++ | Yes |
| Comp. 1 | OF210 ™ (2 nm thick) | — | — | 0.9 | 16.4 | 17.3 | 107 | +++ | No |
| Comp. 2 | Optool DSX ™ | Compound (III) | 4 | 0.6 | 14.3 | 14.9 | 110 | +++ | No |
| Comp. 3 | KY-130 ™ | Compound (III) | >1 | <1.5 | | | 111 | +++ | No |
| Comp. 4 | OF210 ™ | Compound (III) | 0.73 | 1.3 | 15.3 | 16.6 | 105 | +++ | No |
| Comp. 5 | OF210 ™ | Compound (III) | 1.9 | 0.9 | 19.6 | 20.5 | 104 | +++ | No |
| Comp. 6 | Compound (III) | OF210 ™ | na | na | na | na | 42-70 | + | Yes |
| Comp. 7 | Compound (III) | Optool DSX ™ | na | na | na | na | 35-50 | + | Yes |
| Comp. 8 | Compound (III) (12 nm thick) (***) | | — | 23.2 | 29.3 | 52.5 | 42.5 | + | Yes |

$E^P$ and $E^D$: Polar and dispersive components of the surface energy of the precursor for an antifogging coating, $E^T$ denoting the total energy.
(*) Ratio of physical thickness.
(**) After application of a surfactant solution.
(***) Thickness including the surplus of siloxane compound.
na: not measured.

The antisoiling behavior of an ophthalmic lens according to the invention, example 7 with respect to soiling, is explained in detail below, in comparison with ophthalmic lenses from the prior art (lenses from the comparative examples Comp. 1 and Comp. 8).

+ indicates that the antisoiling properties of the lens are of the same order as the lens from comparative example 8 taken as reference.

+++ indicates that the lens has antisoiling properties that are greater than that of the lens from comparative example 8 taken as reference (haze level of less than 3.9%) after two rotations (according to the cleanability protocol described below according to test no. 1 (CEMOI fabric)).

Method
Procedure/Cleanability

The test is carried out in a room regulated in temperature at 22° C.±3° C. and at a degree of ambient humidity of 50%±10%. Soiling is obtained by applying to the center of the lens a finger mark from a finger that has been preimpregnated with artificial sebum (consisting predominantly of oleic acid). The soiling obtained (artificial sebum) is in the form of a mark having a diameter of around 20 mm.

The lenses are then subjected to automatic wiping with the aid of the optionally impregnated microfiber fabric, attached to a mechanical robot, under a load of 750 g (perfectly reproducible back-and-forth movement). One wiping operation corresponds to one forward movement or one backward movement of the fabric. The total travel during the movement of the fabric on the lens is 40 mm, i.e. 20 mm on either side of a point centered on the soiling. The textile is always applied in the same direction against the lens. Since the movement starts from the center during the 1$^{st}$ movement, the value of 2 which is mentioned during the very first displacement is in fact 1.5.

The value of the haze in transmission (denoted by H) through the lens is measured with a Hazeguard XL 211 Plus device, first measurement carried out at the center of the lens over a zone covered by the sebum, then after a number of wiping operations equal to 2, 5, 10, 20 or 30 (the values mentioned are the combined values from the start of the wiping operations).

The haze H is obtained in accordance with the ASTM D1003 standard "Standard test method for haze and luminous transmittance of transparent plastics" by simultaneously measuring the total amount of light transmitted by the lens (l total) and the amount of scattered light, in transmission (l scattered: amount of light transmitted and deflected by an angle of greater than 2.5° relative to the normal direction):

$$H(\%) = \frac{l\ scattered}{l\ total} \times 100$$

The more rapidly the Haze H decreases, the faster the cleaning and the better the cleanability.

Test no. 1: The cleanability of the ophthalmic lens from example 7 according to the invention is tested according to the above protocol with a CEMOI™ fabric.

FIG. 1 shows that:

the ophthalmic lens according to the invention is much less sensitive to soiling than the lens from comparative example 8 which is a lens having a surface that comprises a precursor for an antifogging coating from the prior art.

Indeed, a finger mark generates much more haze in the case of comparative example 8 than in the case of example 7 according to the invention.

the ophthalmic lens according to the invention is cleaned much more rapidly than a lens according to comparative example 8 and is cleaned just as well as the ophthalmic lens from comparative example 1 coated solely with the OF210™ antisoiling coating.

The haze is reduced by a factor of 8 starting from the first cleaning cycle (2 rotations).

Test no. 2: Test no. 1 is reproduced except that a dry-feel CEMOI™ fabric impregnated with 30% by weight of Capstone™ FS 3100 is used.

Figure 2:
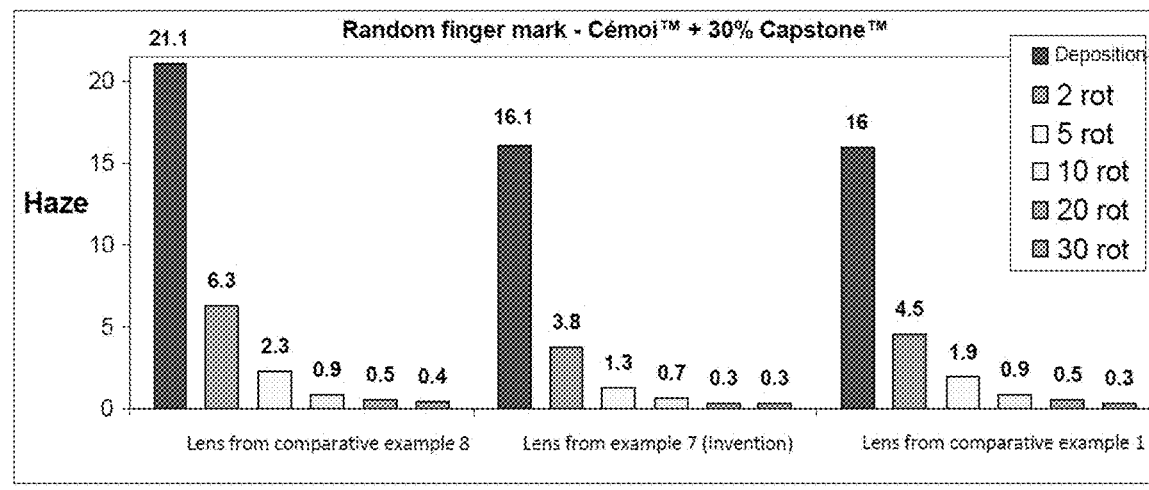
FIG. 2: shows that the ophthalmic lens according to the invention is cleaned better than a lens according to the two comparative examples, in particular with respect to the lens from comparative example 8, the invention is better.

FIG. 2 shows that the ophthalmic lens according to the invention is cleaned better than a lens according to the two comparative examples, in particular with respect to the lens from comparative example 8, the invention is better.

Test no. 3: Test no. 2 is reproduced except that, before applying the finger mark, the surface of the ophthalmic lenses is treated with a dry-feel CEMOI™ fabric comprising 30% by weight of Capstone™ FS 3100 (5 rotations).

Thus, antifogging ophthalmic lenses having a very thin layer of Capstone™ FS 3100 at their surface are therefore tested.

Figure 3:
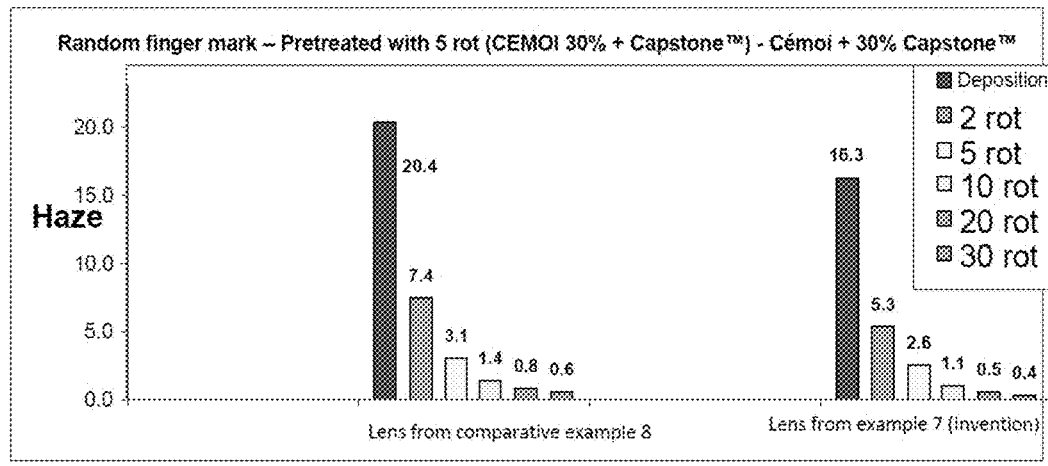
FIG. 3: shows that the ophthalmic lens according to the invention has cleanability properties better than those of a lens according to comparative example 8.

FIG. 3 confirms that the ophthalmic lens according to the invention has cleanability properties better than those of a lens according to comparative example 8.

The invention claimed is:

1. An optical article comprising a substrate coated with a precursor coating for an antifogging coating, wherein a surface of the precursor coating for an antifogging coating has a static contact angle with water of greater than or equal to 95° and a polar component of a surface energy of greater than 1.5 mJ/m$^2$, the precursor coating for the antifogging coating comprises at least one hydrophilic organosilane compound A and at least one hydrophobic organosilane compound B, and the precursor coating for the antifogging coating is coated with a surfactant film.

2. The optical article of claim 1, wherein the polar component of the surface energy is greater than or equal to 1.7 mJ/m$^2$.

3. The optical article of claim 2, wherein the polar component of the surface energy is greater than or equal to 2 mJ/m$^2$.

4. The optical article of claim 1, wherein the precursor coating for the antifogging coating has a static contact angle with water of greater than or equal to 100°.

5. The optical article of claim 1, wherein the precursor coating for the antifogging coating is formed from a material comprising at least one fluorocarbon group and at least one polyoxyalkylene group.

6. The optical article of claim 1, wherein the compound A is an organosilane comprising at least one polyoxyalkylene group and at least one silicon atom bearing at least one hydrolyzable group.

7. The optical article of claim 1, wherein the compound B is an organosilane comprising at least one fluorocarbon group and at least one silicon atom bearing at least one hydrolyzable group.

8. The optical article of claim 1, wherein the precursor coating for the antifogging coating has a surface energy of less than or equal to 25 mJ/m$^2$.

9. The optical article of claim 1, further defined as an ophthalmic lens.

10. A process for preparing an optical article of claim 1, comprising:
    providing a substrate comprising at least one main surface;
    depositing on the main surface of the substrate at least one hydrophilic organosilane compound A and at least one hydrophobic organosilane compound B, so as to obtain a precursor coating for an antifogging coating, wherein the precursor coating for an antifogging coating has a static contact angle with water of greater than or equal to 95° and a polar component having a surface energy of greater than 1.5 mJ/m$^2$; and
    depositing a surfactant film on the precursor coating for the antifogging coating.

11. The process of claim 10, wherein the compounds A and B are deposited by vacuum evaporation.

12. The process of claim 11, wherein the compound A is deposited by vacuum evaporation using a Joule-effect heat source, and the compound B is deposited by vacuum evaporation using an electron gun.

13. The process of claim 10, wherein the precursor coating for the antifogging coating is formed by successive depositions of the compound B and then of the compound A.

14. The optical article of claim 1, wherein the precursor coating for the antifogging coating is formed by successive deposition of said hydrophobic organosilane compound B and then of said hydrophilic organosilane compound A.

15. An assembly comprising:
    an optical article comprising a substrate coated with a precursor coating for an antifogging coating, wherein a surface of the precursor coating for an antifogging coating has a static contact angle with water of greater than or equal to 95° and a polar component of a surface energy of greater than 1.5 mJ/m$^2$, the precursor coating for the antifogging coating comprises at least one hydrophobic organosilane compound B and at least one hydrophilic organosilane compound A; and
    a surfactant.

16. The assembly of claim 15, comprising the optical article and a fabric impregnated with the surfactant.

17. The assembly of claim 15, comprising the optical article and a dry wipe comprising a microfiber fabric impregnated with the surfactant.

18. The assembly of claim 15, wherein the surfactant has a hydrophilic-lipophilic balance (HLB)≥5.

* * * * *